(12) United States Patent
O'Connell et al.

(10) Patent No.: US 8,172,400 B2
(45) Date of Patent: May 8, 2012

(54) PROJECTION APPARATUS AND METHOD

(75) Inventors: Ian O'Connell, London (GB); James Rock, London (GB)

(73) Assignee: Musion IP Limited (GB)

( * ) Notice: Subject to any disclaimer, the term of this patent is extended or adjusted under 35 U.S.C. 154(b) by 688 days.

(21) Appl. No.: 12/158,655

(22) PCT Filed: Dec. 21, 2006

(86) PCT No.: PCT/GB2006/004849
§ 371 (c)(1),
(2), (4) Date: Oct. 3, 2008

(87) PCT Pub. No.: WO2007/072014
PCT Pub. Date: Jun. 28, 2007

(65) Prior Publication Data
US 2009/0213331 A1    Aug. 27, 2009

(30) Foreign Application Priority Data

Dec. 21, 2005   (GB) .................................. 0525993.2

(51) Int. Cl.
G03B 21/26 (2006.01)
G03B 21/22 (2006.01)
G03B 21/00 (2006.01)
(52) U.S. Cl. .............................. 353/30; 353/119; 353/10
(58) Field of Classification Search .............. 353/29–31, 353/121, 10, 94, 119; 359/478, 629, 443, 359/460, 462; 352/86, 85, 87; 345/7, 9, 345/419, 633; 348/14.07, 586, 587, 625
See application file for complete search history.

(56) References Cited

U.S. PATENT DOCUMENTS

| 4,971,312 | A |   | 11/1990 | Weinreich |         |
|-----------|---|---|---------|-----------|---------|
| 5,255,028 | A | * | 10/1993 | Biles     | 353/7   |
| 5,528,425 | A |   | 6/1996  | Beaver    |         |
| 5,573,325 | A | * | 11/1996 | Lekowski  | 353/79  |
| 5,685,625 | A | * | 11/1997 | Beaver    | 353/28  |
| 5,865,519 | A | * | 2/1999  | Maass     | 353/28  |
| 5,913,591 | A | * | 6/1999  | Melville  | 353/28  |
| 6,481,851 | B1 | * | 11/2002 | McNelley et al. | 353/28 |

FOREIGN PATENT DOCUMENTS

| WO | 2005096095 |   | 10/2005 |
| WO | WO2005/096095 | * | 10/2005 |
| WO | WO 2005096095 A |   | 10/2005 |

OTHER PUBLICATIONS

International search report in corresponding GB0525993.2.
International search report in corresponding GB0625525.1.
International Search Report issued Aug. 3, 2007 in parent application International Application No. PCT/GB2006/004849 filed Dec. 21, 2006.

* cited by examiner

*Primary Examiner* — Georgia Y Epps
*Assistant Examiner* — Pascal M Bui Pho
(74) *Attorney, Agent, or Firm* — Thomas, Kayden, Horstemeyer & Risley, LLP.

(57) ABSTRACT

Projection apparatuses and methods are provided. A representative apparatus includes: a first projection device arranged to generate a virtual three-dimensional image; a second projection device arranged to project a background image; and a light source arranged to project light onto the virtual three-dimensional image, the frequency of the projected light corresponding to the light frequency of the background image.

22 Claims, 7 Drawing Sheets

PROJECTION APPARATUS AND METHOD

CROSS REFERENCE TO RELATED APPLICATIONS

This application is a National Stage of International Application No. PCT/GB2006/004849 filed on Dec. 21, 2006 and published under PCT Article 21(2) in English, which claims priority to Great Britain Application No. 0525993.2 filed on Dec. 21, 2005. The entire contents of each of these applications are herein incorporated by reference.

This invention relates to a projection apparatus and method. More particularly, but not exclusively, it relates to a projection apparatus arranged to limit transparency of a virtual image when projected in front of a background projected image.

Projection apparatus which create the illusion of the presence of a virtual three-dimensional image are known, for example WO 2005/096095 (fusion Systems Limited) and EP 0799436 (Maass, Uwe) both describe an apparatus which creates a virtual image and such arrangements are commonly referred to as a "Pepper's ghost" arrangement.

It has been found during use in cinemas, theatres, publicity or promotional displays that Pepper's ghost arrangements have inherent limitations when a second image or background image is simultaneously projected behind the virtual image. Such an arrangement is known as a composite image (i.e. a view created by a composite of images). One example of a composite image is one where a background image comprises a football pitch and one side of a football stadium and the virtual image may be projected such that one or more football players appear to be running in front of the stadium and on the football pitch. In this arrangement it has been found that the virtual image appears to have an element of transparency or "see-through" because of the light projected from the background image. This effect is clearly disadvantageous as the clarity and therefore reality of the illusion is impeded.

Thus, according to one aspect of the invention there is a provided an image projection apparatus which comprises:
(a) a first projection device arranged to create a virtual image; and
(b) a second projection device arranged to project a background image having one or more darkened areas such that the second projection device is arranged to generate an image wherein at least a portion of the darkened areas are within the outline of the virtual image when viewed.

According to a further aspect of the invention there is a provided an image projection apparatus which comprises:
(a) a first projection device arranged to generate a virtual three-dimensional image;
(b) a second projection device arranged to project a background image; and
(c) means to minimise transparency of the virtual image relative to the background image.

In one embodiment the transparency minimising means comprise one or more darkened areas on the background image, arranged such that at least a portion of the one or more darkened areas is within the outline of the virtual image when viewed.

It will be appreciated that the one or more darkened areas may be any shade of colour suitable to impede light projecting from the background image thereby reducing transparency (or "see-through") of the virtual image. In one embodiment, the one or more darkened areas are grey or black. In a further embodiment, the one or more darkened areas are black.

In one embodiment, the second projection device is arranged to generate the one or more darkened areas. Thus the darkened area may be composed of dark light. In one embodiment, the dark light may comprise grey or black light. In a yet further embodiment, the dark light may comprise an absence of light.

In one embodiment, the darkened area may be composed of light of a frequency, i.e. colour, that corresponds to the light frequency, i.e. colour, of the virtual image.

In an alternative embodiment, the transparency minimising means comprise a light source arranged to project light onto the virtual three-dimensional image, the frequency, i.e. colour, of the projected light corresponding to the light frequency, i.e. colour of the background image. This arrangement creates a virtual image which is sharper, more solid and more realistic to the viewer when viewed at a variety of angles.

Embodiments of the invention therefore provide an advantage of limiting the problem of transparency when using composite images. For example, the provision of the transparency minimising means prevents the projection of light from the background image bleeding through the virtual image. The invention therefore provides an arrangement wherein the clarity and reality of the virtual image is greatly enhanced.

In addition, the invention provides a flexible system for enhancing the clarity of the virtual three-dimensional image, for example, the system avoids the need for complex apparatus. This has the consequence of enabling the images to be projected onto a wide variety of substrates, e.g. a floor, ceiling or wall etc.

In one embodiment, the first projection device arranged to create a virtual image comprises any projection device capable of creating a virtual image. These devices are known to those skilled in the art, for example, those described in WO 2005/096095 (attached herein as Annex 1) and EP 0799436. In a further embodiment, the first projection device arranged to create a virtual image comprises the projection apparatus described in WO 2005/096095, which is hereby incorporated by reference.

In a yet further embodiment, the first projection device comprises a projector, a frame, and an at least partially transparent screen: the frame being arranged to retain the screen under tension, such that the screen is inclined at an angle with respect to a plane of emission of light from the projector; the screen having a front surface arranged such that light emitted from the projector is reflected therefrom; and the projector being arranged to project an image such that light forming the image impinges upon the screen such that a virtual image is created from light reflected from the screen, the virtual image appearing to be located behind the screen.

In one embodiment, the second projection device comprises any projection device suitable for providing a background image for the virtual image created by the first projection device. In a further embodiment, the second projection device is a rear projection device (e.g. a screen mounted in front of a conventional projector or light source). In an alternative embodiment, the second projection device may comprise a plasma screen, an LED wall or a live lighting arrangement.

It will be appreciated that it may be desirable for the transparency minimising means to be within the outline of the virtual three-dimensional image or projected onto the virtual three-dimensional image itself for the clarity and reality of the virtual image to be enhanced. Thus, in one embodiment, the image projection apparatus additionally comprises means for controlling the size, shape and/or position of the transparency minimising means.

In a specific embodiment, the image projection apparatus additionally comprises means for controlling the size, shape and/or position of the one or more darkened areas on the background image. In another embodiment, the image projection apparatus additionally comprises means for controlling the size, shape and/or position of the projected light.

In a further embodiment of the invention, the means for controlling the size, shape and/or position of the transparency minimising means comprise processing means.

It will be appreciated that when controlling the size, shape and/or position of the one or more darkened areas on the background image, the darkened area will ideally be as large as possible. For example, the overall outline of the one or more darkened areas may be of a size, shape and position such that they create a silhouette which obscures an area corresponding to less than the area of the virtual image (e.g. roughly any one of 50, 60, 70, 80, 90, 95, 97 or 99% of the area of the virtual image).

It may also be envisaged that the one or more darkened areas have a greater area than the virtual image (e.g. roughly any one of 105, 110 or 120% of the area of the virtual image). However, although the clarity and reality of the virtual image will still be enhanced, this arrangement may result in a darkened "halo effect" around the periphery of the virtual image.

Alternatively, the one or more darkened areas may be identical to the area of the virtual image (e.g. 100% of the area of the virtual image).

It will be appreciated that several variables influence the ideal size, shape and/or position of the one or more darkened areas. A first factor is the distance between the background image and the virtual image, hereinafter referred to as variable x. A second variable, y, relates to the angles of variability between the virtual image and a viewer at the highest point ($y_1$, a viewer at the right-most point ($y_2$), a viewer at the lowest point ($y_3$) and a viewer at the left-most point ($y_4$). A third variable, z, may be the degree of movement of the virtual image.

Thus, in one embodiment, the processing means will be arranged to control the size, shape and/or position of the one or more darkened areas on the background image by adjustment of the size, shape and/or position of the one or more darkened areas in response to the values inputted for the distance between the background image and the virtual image, the angles of variability between the virtual image and a viewer at the highest point, a viewer at the right-most point, a viewer at the lowest point and a viewer at the left-most point, and the degree of movement of the virtual image.

It will be appreciated that without taking account of variables x, $y_x$-$y_4$ and z, the one or more darkened areas may not be visible to a viewer located centrally in an auditorium, whereas a viewer seated at the far left of an auditorium may observe a darkened area to the left of the virtual image and similarly, a viewer seated higher up may observe a darkened area above the virtual image.

For example, if x is negligible because the virtual image appears immediately in front of the background image and there is just one viewer located centrally then the one or more darkened areas may be 100% of the area of the virtual image. However, the greater the values for x and $V_1$-$V_4$ become, the greater the need to reduce the size of the one or more darkened areas. Furthermore, each of the variables $y_r$,$y_4$ may rapidly change depending upon the variability of variable z (e.g. if a character comprising the virtual image moves from one side of the stage to the other then variables yi-$y_4$ will correspondingly change).

Thus, the processing means is arranged to start with the one or more darkened areas which create a silhouette which corresponds to 100% of the area of the virtual image. For any given increase in the value of x, the overall size of the one or more darkened areas will proportionally decrease. Similarly, for increased values of $V_1$, the processing means is arranged for the upper edge of the one or more darkened areas to be moved downwards to a certain level such that the one or more darkened areas are not visible by a viewer at the highest point. Similarly, for increased values of $y_2$, the processing means will arrange for the right-hand edge of the one or more darkened areas to be moved leftwards to a certain level such that the one or more darkened areas are not visible by a viewer at the right-most point. For increased values of $y_3$, the processing means will arrange for the lower edge of the one or more darkened areas to be moved upwards to a certain level such that the one or more darkened areas are not visible by a viewer at the lowest point. Furthermore, for increased values of $y_4$, the processing means will arrange for the left-hand edge of the one or more darkened areas to be moved rightwards to a certain level such that the one or more darkened areas are not visible by a viewer at the left-most point.

In a further embodiment, the means for controlling the size, shape and/or position of the one or more darkened areas on the background image comprise processing means configured to adjust the position of any one of:
(a) one or more screen used to project the images;
(b) the stage floor;
(c) the viewing platform; and/or
(d) a seat of a viewer.

Thus, rather than adjust the size, shape and/or position of the one or more darkened areas in response to the location of the viewers, the processing means may physically adjust the positions of one or more screen as in 5 feature (a) above. For example, if the images are intended to be viewed by a large number of people sitting in a variety of positions, the processing means may adjust one or more screen such that they are closer together (i.e. reducing the value of x to a negligible value).

Additionally or alternatively, the processing means may also move the stage floor upon which the projection apparatus is mounted as in feature (b) above. For example, the processing apparatus may arrange to raise, lower or tilt the stage upwards or downwards depending upon the level and height of the viewing platform.

Furthermore, the processing means may also move the viewing platform or a seat of a viewer as in features (c) and (d) above. For example, the processing apparatus may arrange to tilt the viewing platform upwards or downwards depending upon the level and height of the viewing area. As a 0 further example, the processing apparatus may be arranged to raise, lower or tilt a seat of a viewer depending upon the angle of the seat from the virtual image. As a yet further example, the viewing platform and a seat of a viewer may be independently moveable relative to each other.

The embodiment wherein the processing means are configured to move the viewing platform or a seat of a viewer has significant advantages with respect to enhancing the reality of the virtual image. For example, cinema and television screens are two-dimensional and have limitations with respect to creating the illusion of three-dimensional images. When attempting to create a perspective of depth on a two-dimensional screen, cameras are typically placed to give a birds-eye view so that when an object is moving away from a viewer, the image moves upwards upon the screen to give the impression of movement and depth upon the three-dimensional plane. Therefore, tilting the floor towards the viewer or raising the seat of the viewer provides the viewer with an almost identical birds eye view to that provided by a two-dimensional screen and provides enhancement in reality of the virtual image being three-dimensional (i.e. creating an illusion that movement is in two planes of view rather than one).

The embodiment wherein the processing means are configured to move the viewing platform or a seat of a viewer has a significant advantage when the projection apparatus is applied to home computer or arcade gaming technology. For example, movement of the seats and/or floor in response to movement of a virtual image on the screen will not only ensure that the viewer does not see the darkened areas but will also provide a more interactive element to gaming.

In one embodiment, movement of the one or more screen, stage floor, viewing platform and/or seat is provided by an actuator or electric motor.

The invention finds utility in a wide range of applications, for example, the image projection apparatus may be used in cinemas, theatres, shopping complexes, games arcades, home entertainment (e.g. home computer gaming), hotels, leisure complexes and the like.

As a second aspect of the invention there is provided an entertainment pod comprising an image projection apparatus as defined herein and one or more seat.

In one embodiment, each of the seats comprises an input device.

In an embodiment wherein the entertainment pod is for cinematic viewing, the input device will be a remote control having standard inputs associated with home cinema (e.g. television, DVD and Video machine remote controls).

In an embodiment wherein the entertainment pod is for home computer or arcade gaming, the input device will be a joystick or control pad or any other control means associated with home computer or arcade gaming.

As a further aspect of the invention there is provided a method of enhancing the clarity of a virtual image when projected in front of a background image which comprises the step of incorporating one or more darkened areas within the background image wherein at least a portion of the darkened areas are within the outline of the virtual image when viewed.

As a further aspect of the invention there is provided a method of enhancing the clarity of a virtual image, as hereinbefore defined, generated by a first projection device when projected in front of a background image generated by a second projection device which comprises the step of incorporating one or more darkened areas within the background image wherein at least a portion of the darkened areas is within the outline of the virtual image when viewed.

In a further embodiment, the method additionally involves the use of the second projection device to generate the darkened areas. In one embodiment, this may be through the use of dark light or through the absence of light in that area. In one embodiment, the dark light comprises grey or black light. In a further embodiment, the dark light comprises black light. In another embodiment, this may be through the use of a light of a frequency, i.e. colour, that corresponds to the light frequency, i.e. colour, of the three-dimensional virtual image.

As a further aspect of the invention there is provided a method of enhancing the clarity of a virtual three-dimensional image generated by a first projection device when projected in front of a background image generated by a second projection device which comprises the step of projecting light onto the virtual three-dimensional image wherein the frequency, i.e. colour, of the projected light corresponds to the light frequency, i.e. colour, of the background image.

The invention will now be described, by way of example only, with reference to the accompanying drawings, in which.

Figure 1:
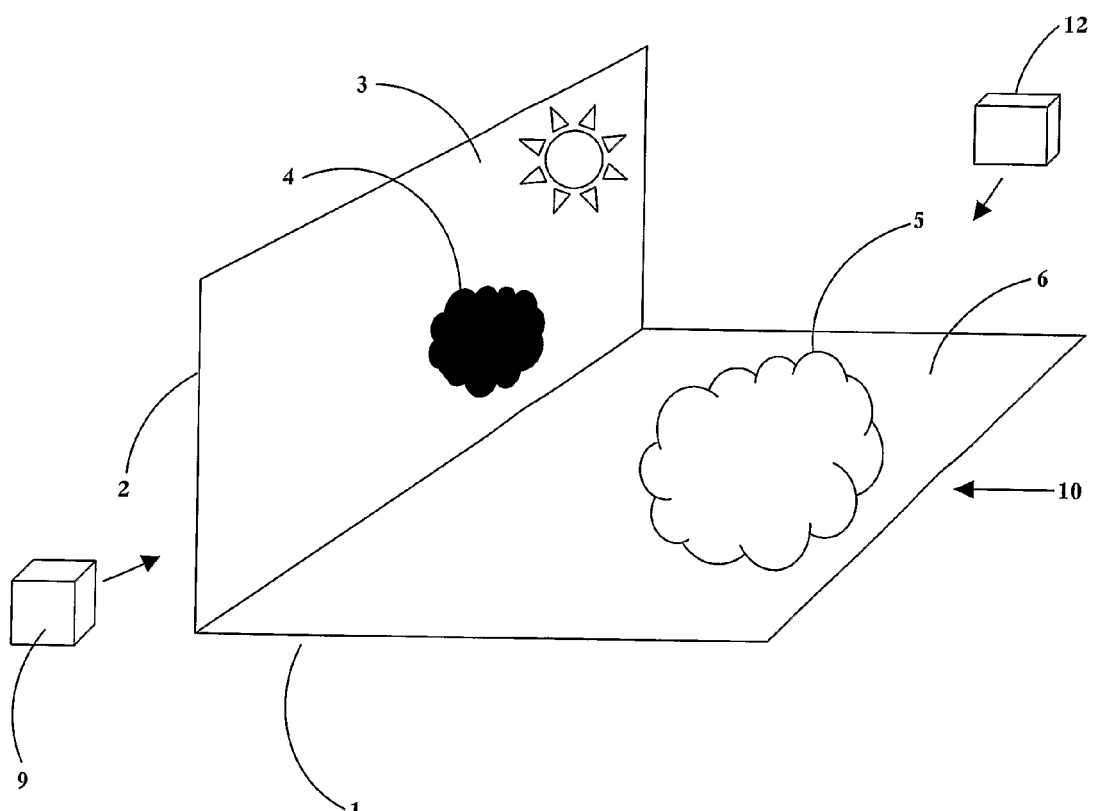
FIG. 1 is a schematic representation of the image projection apparatus in accordance with the shadowing embodiment of the invention.

Referring first to FIG. 1, an image projection apparatus, shown generally as 1, comprises a horizontal stage platform 6 and a vertical rear projection screen 2. A first projection device 12 has been assembled in accordance with the procedures described in WO 2005/096095 (as reproduced below) to create a virtual image 5. The virtual image 5 is shown in FIG. 1 as a cloud, although it will be appreciated that any other virtual images may be envisaged. A second projection device 9 has been assembled to project a background image 3 onto the vertical rear projection screen 2. The background image 3 is shown in FIG. 1 as a sky scene comprising a blue sky and a bright sun, although it will be appreciated that any other background images may be envisaged.

A single darkened area 4 is simultaneously projected onto the background image 3. The shape of the darkened area 4 largely corresponds to the shape of the virtual image 5 (e.g. the darkened area is also cloud shaped). In use, the presence of the darkened area 4 prevents light emitting from this area of the generally bright blue sky scene background image. Thus, the cloud is prevented from appearing transparent and will appear clear and realistic to the viewer when viewing the apparatus in the direction of arrow 10.

Figure 2:
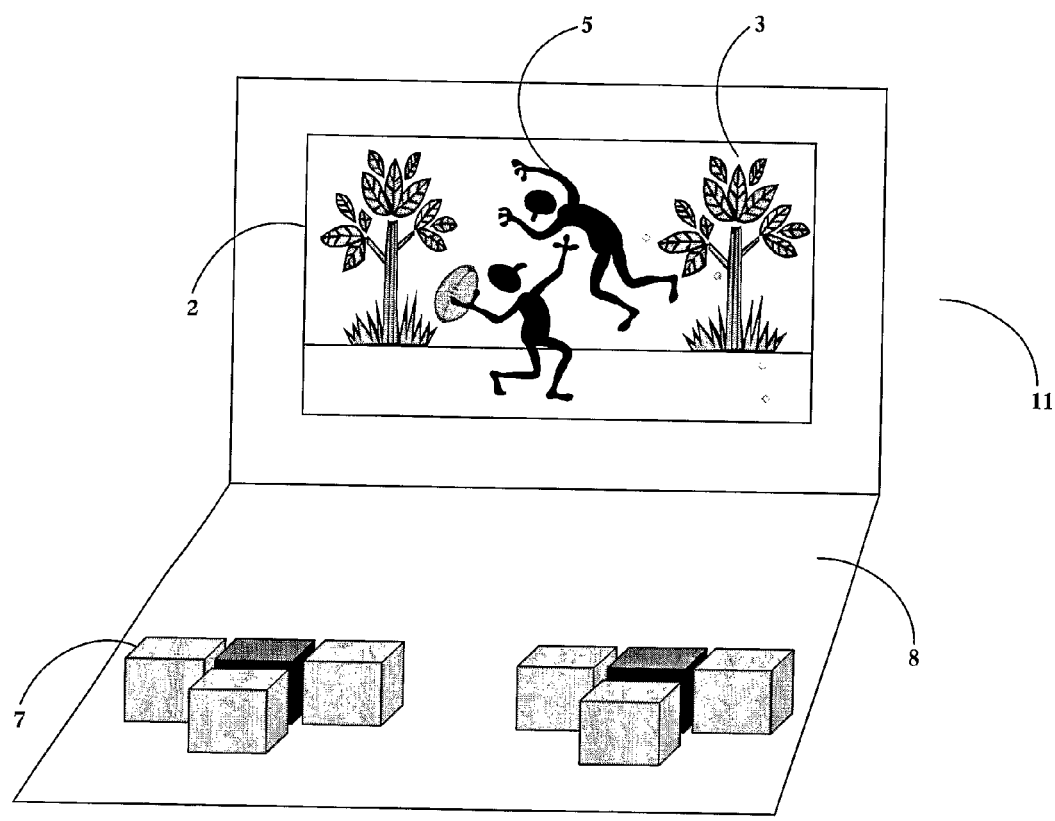
FIG. 2 is a schematic representation of an entertainment pod comprising the image projection apparatus in accordance with one aspect of the invention.

FIG. 2 shows one embodiment of an entertainment pod comprising the image projection apparatus according to the invention. The entertainment pod, shown generally as 11, has a vertical rear projection screen 2, a background image 3 and a virtual image 5 (all exactly as configured in FIG. 1). In this embodiment, the background image 3 is a grassy landscape having trees and the virtual image 5 comprises characters playing sport, although it will be appreciated that any other images may be envisaged. The pod 11 additionally comprises a viewing platform 8 which has a plurality of seats 7 for allowing the images projected to be viewed.

In alternative embodiments, the seats 7 and/or the viewing platform 8 may be fitted with one or more actuators or electric motors (not shown) each of which are capable of raising, lowering or tilting the seats 7 and/or the viewing platform 8.

Figure 3:
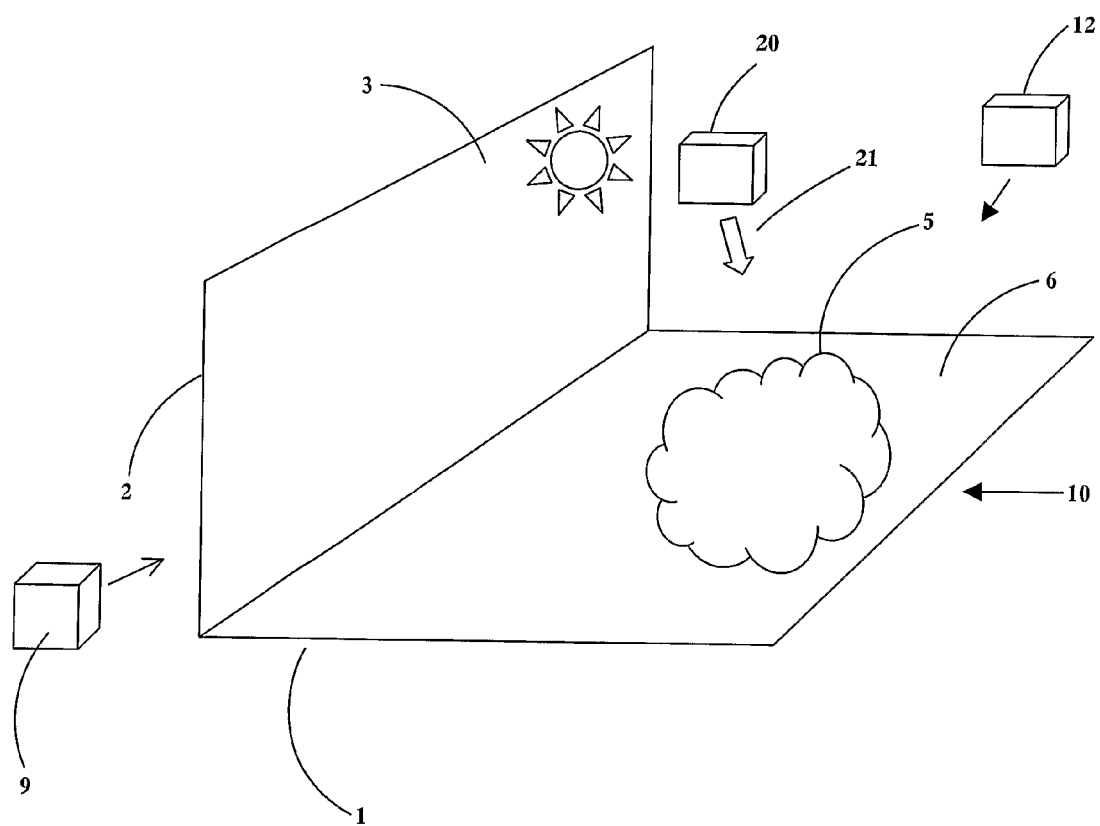
FIG. 3 is a schematic representation of the image projection apparatus in accordance with the light projecting embodiment of the invention.

In a further embodiment of the invention, the arrangement of FIG. 1 may be modified to incorporate the embodiment wherein the transparency minimising means comprise a light source arranged to project light onto the virtual three-dimensional image which corresponds to the frequency, i.e. colour of the background image as shown in FIG. 3. In this arrangement, the background image is primarily a blue sky 3 and the virtual three-dimensional image is a white cloud 5. In this embodiment, a light source 20 will project blue light 21 onto the cloud. This arrangement avoids the need for the darkened area 4 and for the size, shape and/or position of the darkened area 4 to be controlled depending upon the viewing positions.

Figure 4:
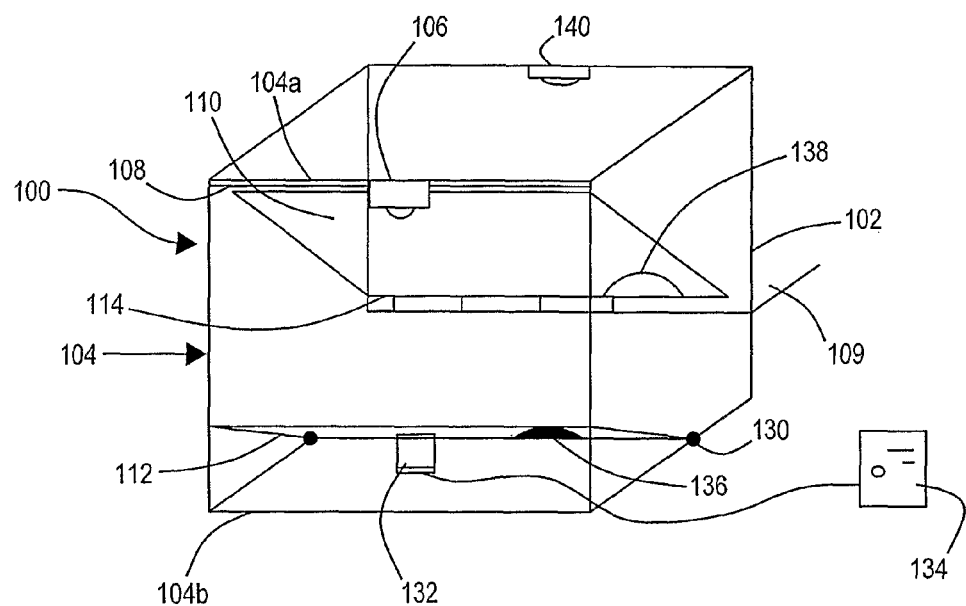
FIG. 4 is a schematic representation of a first embodiment of a projection apparatus according to at least an aspect of the present invention.
Figure 5A:
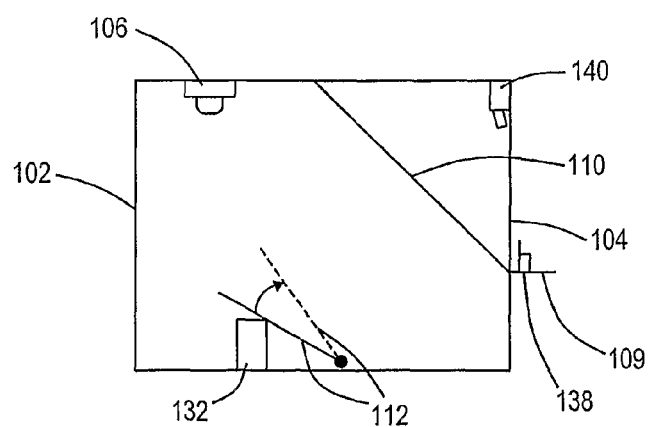
FIG. 5A is a side view of a the projection apparatus of FIG. 4 showing a pigmented reflective member in first and second positions.
Figure 7:
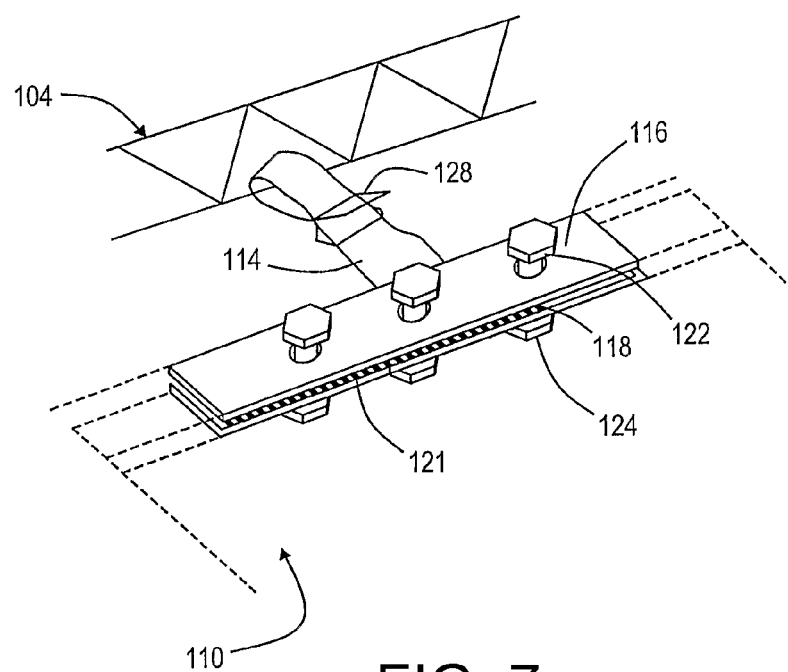
FIG. 7 is a perspective view of a screen clamping arrangement of FIGS. 4, 5A and 6.

Referring now to FIGS. 4, 5A and 7, a projection apparatus 100 comprises a box frame 102 formed of trusses 104, a projector 106, a support frame 108, a screen 110 held within the support frame 108 and a grey pigmented reflective board 112.

The projector 106 depends from a front upper cross-piece truss 104a of the box frame 102. The board 112 lies below the projector 106 at the base of the box frame 102. The screen 110, is inclined at approximately 45° to the horizontal and the front edge of the screen 110 is proximate the front upper cross-piece truss 104a of the box frame 102 and the rear edge of the screen is proximate a stage 109 that lies to the rear of the box frame 102.

The screen 110 is typically a polymeric foil, which can have a partially reflective coating upon a front face of the foil. The screen 110 is retained within the box frame 102 by means of tensioning straps 114 attached to the box frame 102, at the top and bottom edges of the screen 110. At a free end of each of the tensioning straps 114 there is pair of clamp jaws 116 which have respective openings 118,120 passing therethrough. The faces of the jaws 116 are optionally coated with an abrasive 121, such as sandpaper, in order to enhance the grip of the jaws 116 upon the screen 110.

Edges of the screen 110 are placed between the jaws 116 and a bolt 122 is placed through the openings 118, 120 and passes through the screen 110. A nut 124 is threaded onto the bolt 122 and tightened to hold the screen 110 between the jaws 116. The tensioning straps 114 pass through the trusses 104 and are tightened using a friction locking buckle arrangement 128.

Each of the tensioning straps 114 can be tightened or loosened individually so as to allow an even tension to be applied over the whole surface of the screen 110 thereby reducing, and ideally eliminating, the formation of wrinkles upon the screen 110 which reduce the quality of an image projected upon the screen 110.

The reflective board 112 lies below the projector 106 adjacent to a lower front cross-piece truss 104b of the box frame 102. The projector 106 is directed such that light emitted by the projector 106 strikes the reflective board 112. The board 112 is inclined so that the light emitted by the projector 106 is reflected upwards from the board 112 onto the screen 110. The use of a grey, or otherwise coloured board 112 reduces the milky hue associated with light from the projector where there is no image to be projected.

A fraction of the projected light striking the screen 110 is reflected from the front surface of the screen 110 where is can be viewed by an audience. A presenter upon the stage 109 behind the screen 110 can also be viewed by the audience but does not interfere with the viewing of the image by the audience.

The board 112 is connected to a hinge arrangement 130 along a rear edge thereof. The hinge arrangement 130 allows the board 112 to be raised and lowered, typically be a hydraulic ramp 132 controlled by a computer 134, in order to compensate for the 'keystone' effect. Alternatively, the board 112 can be raised and lowered by the person pulling upon a string, or an electric motor to drive the board up and down.

The raising and lowering of the board 112 also allows for the audience's perception of the positional depth upon the stage of an element of a projected image to be altered by varying the height of the element of the image upon the screen 110. It is envisaged that the board 112 may comprise a number of individual sections each of which may be raised a lowered individually in order to allow the perceived depth of an individual element of an image to be varied independently of other elements of the image.

A non-reflective mask 136 in the shape of a prop 138, in this example a rock, is placed upon the board 112. The prop 138 is place upon the stage 109, typically behind the screen 110. The mask 136 is placed such that the board 112 is obscured in a region corresponding to where the prop 138 is located with respect to the screen 110. This arrangement of mask 136 and prop 138 results in an image, or part of the image, projected upon the screen 110 apparently disappearing as the image, or part of the image, passes over prop 138 and reappearing once the image, or part, of the image has passed over the prop 138 as the mask 136 prevents light being reflected onto the region of the screen 110 corresponding to the location of the prop 138. The mask 136 can be variable in size and shape, for example by means of a sliding panel that is moved into location and varied in size according to the size of the prop 138. This also allows for the depth perception of props to be varied as their apparent effect upon variable depth image elements, as discussed hereinbefore, can be varied appropriately, for example a given size of rock will obscure proportionately more of a distant image than the same rock will of a near image.

A light source 140 is mounted upon the box frame 102 and illuminates the prop 138 in order to reduce the effect of any residual light reflected from the board 112 onto the prop.

Figure 5B:
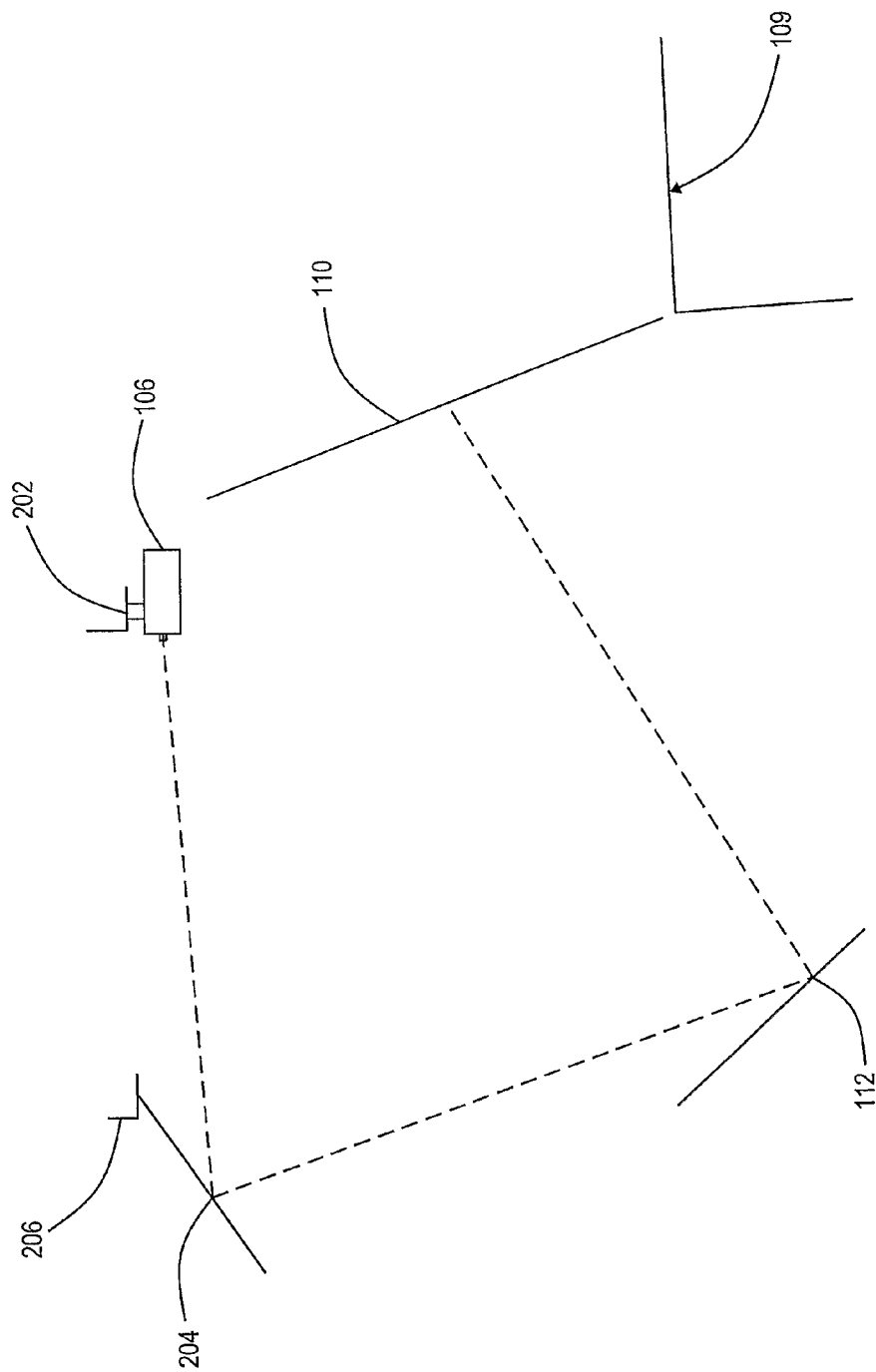
FIG. 5B is a schematic representation of an alternative projection arrangement, suitable for use with the apparatus of FIGS. 4 and 5A.

Referring now to FIG. 5B, an alternative projection arrangement 200, suitable for use with the apparatus of FIGS. 4 and 5A with an additional truss, comprises the projector 106 depending from a truss 202 forward of the screen 110, an inclined mirror 204 of variable inclination depending from a second truss 206 forward of projector 110. The projector 106 projects an image on to the mirror 204 such that the image is projected on to the reflective board 112 and on to the screen 110. The mirror 204 is typically arranged to be perpendicular to the board 112, and in embodiments where the board 112 has a variable angle of inclination the mirror 204 will usually be arranged to track, synchronously, with any variation in the angle of inclination of the board 112.

It will be appreciated that the term mirror is used herein to describe any reflective surface that reflects substantially all, typically in excess of 50% preferably in excess of 80%, light impinging upon it.

Figure 6:
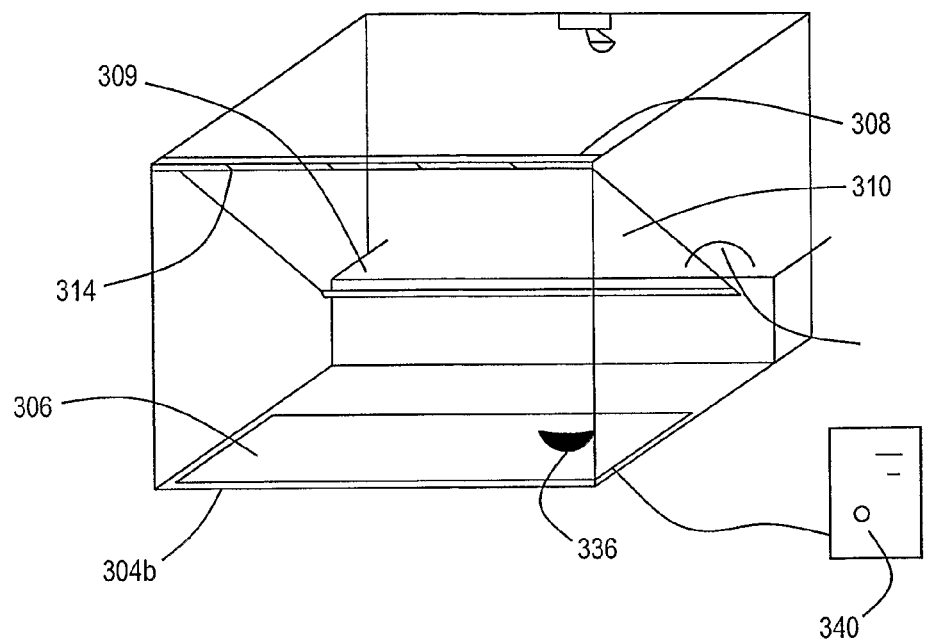
FIG. 6 is a schematic representation of a second embodiment of a projection apparatus according to at least an aspect of the present invention.

Referring now to FIG. 6, a projection apparatus 300 is substantially similar to that of FIGS. 4 and 5A accordingly identical parts to those of FIGS. 4 and 5A are accorded similar reference numerals in the three hundred series.

A projection screen 306 resides in front of the screen 310 adjacent the lower front cross-piece truss 304b. The projection screen 306 is typically a liquid crystal display (LCD) screen or a television screen. The projection screen 306 projects an image upwards onto the front surface of the screen 310. The use of a projection screen 306 removes the 'keystone' effect associated with conventional projectors.

A mask 336 can be formed upon the screen by use of a computer 340 to control the projection screen 306 to black out the appropriate part of the projection screen 306 electronically. This removes the need for a physical mask to be produced. The computer 340 can be used to switch of areas of the projection screen 306 which do not contain part of an image to be projected, this reduces the milky white hue associated with such areas when using conventional projectors. Also, the use of a computer 340 to control the projection screen 306, together with image sizing in relation to image movement allows an image to be readily scaled and positioned upon the projection screen 306 to enhance an audience's perception of depth and movement of a projected image using known image processing techniques. Alternatively, the projection screen 306, or sections of the projection screen 306, can be raised and lowered under the control of the computer 340 in order to enhance the audience's perception of depth of the projected image.

Figure 8:
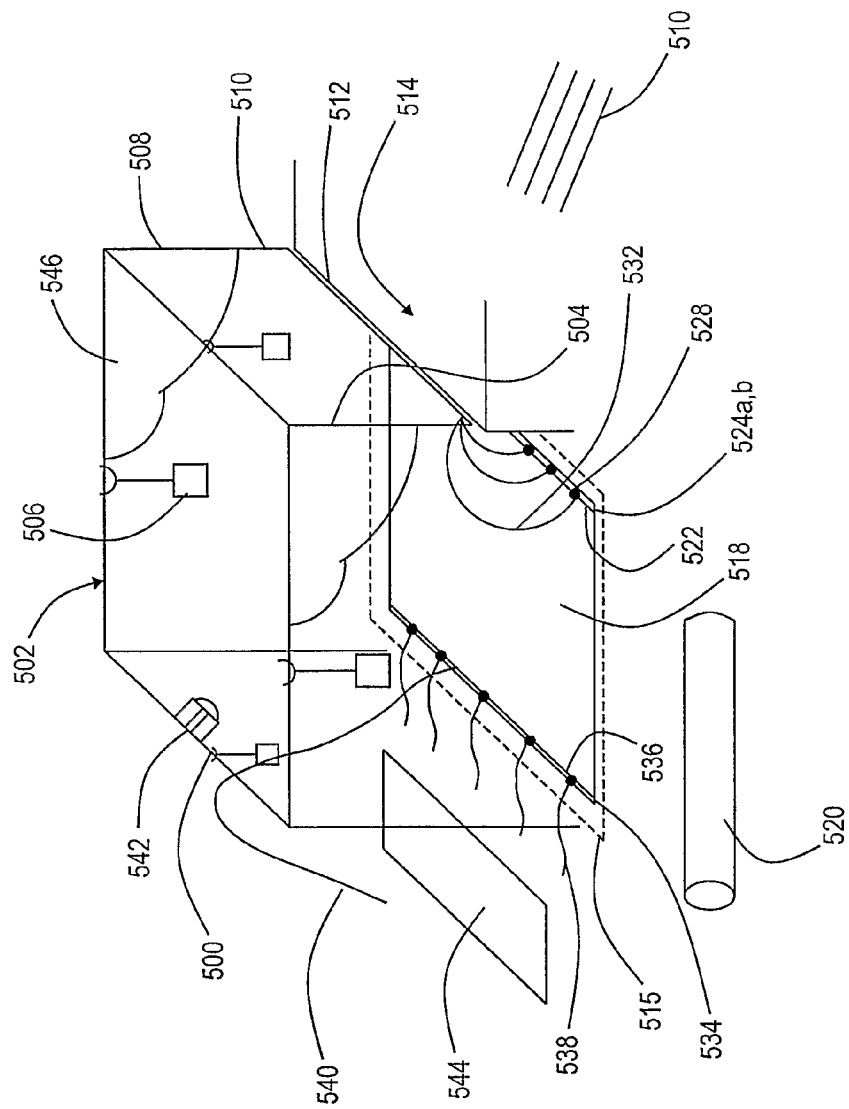
FIG. 8 is a schematic view of a projection apparatus being constructed according to the second aspect of the present invention.

Referring now to FIG. 8, a box truss framework 500 comprises a square upper truss work 502 and leg trusses 504. In constructing the framework 500 the upper truss work 502 rests upon a number of jacks 506. First sections 508 of the leg trusses 504 that extend at right angles to the upper truss work 502 are added at the corners of the upper truss work 502. The height of the jacks 506 is increased to allow additional sections 510 of the leg trusses 504 to be added until the desired height of the box truss framework 500 is achieved.

A cross-piece truss 512 is fixed to two of the leg trusses 504 such that it horizontally spans the gap therebetween at a height close to, and typically slightly below, the level of a stage floor 514. The leg trusses 504 spanned by the cross-piece truss 512 constitute the rear legs of the framework 500 and are located adjacent the front of the stage floor 514.

A dust-free protective plastic sheet 515 is laid across the width of the stage floor 514 in front of the rear legs of the framework 500. A roll of screen film 518 is removed from a protective cylindrical casing 520 and is unwound across the width of the stage floor 514. The film 518 is placed upon the sheet 515 in order to prevent damage to the surface from dust particles or other sharp protrusions.

A lower edge 522 of the film 518 is placed between jaws 524a,b of a retention member 526, each jaw 524a,b having opposed openings therethrough spaced at approximately 0.5 m intervals. Bolts 528 are placed through the openings, and through the film 518, and secured in position using respective nuts. Ratchet straps 532 are attached to the retention member 526 adjacent alternate bolts 528, having a spacing of approximately 1m, and are then attached to the cross-piece truss 512.

A second retention member 534 is attached to an upper edge 536 of the film 518 in a similar manner to how the retention member 526 is attached to the lower edge 522. Ratchet straps 538 are attached to the second retention member 534.

A rope 540 is tied to the second retention member 534 and is passed over the upper truss work 502 opposite the cross-piece truss 512. The film raised into position using the rope 540 and the ratchet straps 538 are attached to the upper truss work 502. Both sets of ratchet straps 532, 538 are tightened individually until the screen film is tensioned such that the film 518 is flat and, ideally, free from wrinkles.

A projector 542 is depended from the upper truss work 502 and a pigmented reflective board 544 is placed between the screen 518 and the front edge of the box truss framework 500 such that light emitted by the projector 542 is reflected from the board 544 onto the screen 518. The screen 518 reflects at least part of the light from a front surface thereof away from the stage and into an auditorium to be viewed by and audience.

In order to prevent the audience observing the projection apparatus both side and front drapes 546 are used to screen the apparatus from the audience.

The invention claimed is:

1. An image projection apparatus comprising:
a first projection device arranged to generate a virtual three-dimensional image;
a second projection device arranged to project a background image; and
means to minimize transparency of the virtual image relative to the background image;
wherein the first projection device comprises a projector, a frame, and an at least partially transparent screen: the frame being arranged to retain the screen under tension, such that the screen is inclined at an angle with respect to a plane of emission of light from the projector; the screen having a front surface arranged such that light emitted from the projector is reflected therefrom; and the projector being arranged to project an image such that light forming the image impinges upon the screen such that a virtual image is created from light reflected from the screen, the virtual image appearing to be located behind the screen.

2. The apparatus of claim 1, wherein the transparency minimizing means comprise one or more darkened areas on the background image, arranged such that at least a portion of the one or more darkened areas is within an outline of the virtual image when viewed.

3. The apparatus of claim 2, wherein the second projection device is arranged to generate the one or more darkened areas.

4. The apparatus of claim 2, wherein the one or more darkened areas are composed of dark light.

5. The apparatus of claim 2, wherein an overall outline of the one or more darkened areas obscures a first area corresponding to any one of 50, 60, 70, 80, 90, 95, 97, 99, 100, 105, 110 and 120% of an area of the virtual image.

6. The apparatus of claim 1 further comprising means for controlling size, shape and/or position of the transparency minimizing means.

7. The apparatus of claim 6, wherein the means for controlling size, shape and/or position of the transparency minimizing means comprise processing means.

8. The apparatus of claim 7, wherein the processing means are arranged to control size, shape and/or position of the one or more darkened areas on the background image by adjustment of the size, shape or position of the one or more darkened areas in response to values inputted for a distance between the background image and the virtual image, angles of variability between the virtual image and a viewer at a highest point, a viewer at a right-most point, a viewer at a lowest point and a viewer at a left-most point, and a the degree of movement of the virtual image.

9. The apparatus of claim 6, wherein the processing means is configured to adjust a position of any of:
(a) one or more screens used to project images;
(b) a stage floor;
(c) a viewing platform; and/or
(d) a seat of a viewer.

10. The apparatus of claim 9, wherein the processing means move the one or more screens closer together.

11. The apparatus of claim 9, wherein the processing means raise, lower or tilt the stage floor upwards or downwards.

12. The apparatus of claim 9, wherein the processing means raise, lower or tilt upwards or downwards the viewing platform or the seat of a viewer.

13. The apparatus of claim 12, wherein the viewing platform and the seat of a viewer are independently moveable relative to each other.

14. The apparatus of claim 9, wherein the position of the one or more screens, stage floor, viewing platform and/or seat of a viewer is adjusted by an actuator or electric motor.

15. The apparatus of claim 1, further comprising:
an entertainment pod having at least one seat from which the virtual three-dimensional image is viewable.

16. The apparatus of claim 15, wherein each of the one or more seats comprises an input device.

17. The apparatus of claim 16, wherein the input device comprises a remote control, joystick or control pad.

18. The apparatus of claim 1, wherein the second projection device is a rear projection device.

19. The apparatus of claim 1, further comprising means for controlling size, shape and/or position of the transparency minimizing means.

20. An image projection apparatus comprising:
a first projection device arranged to generate a virtual three-dimensional image;
a second projection device arranged to project a background image;
means to minimize transparency of the virtual image relative to the background image; and
means for controlling size, shape and/or position of the transparency minimizing means, wherein the means for controlling size, shape and/or position of the transparency minimizing means comprise processing means arranged to control size, shape and/or position of the one or more darkened areas on the background image by adjustment of the size, shape or position of the one or more darkened areas in response to values inputted for a distance between the background image and the virtual image, angles of variability between the virtual image and a viewer at a highest point, a viewer at a right-most point, a viewer at a lowest point and a viewer at a left-most point, and a the degree of movement of the virtual image.

21. The apparatus of claim 20, wherein the second projection device is a rear projection device.

22. An image projection apparatus comprising:
a first projection device arranged to generate a virtual three-dimensional image;
a second projection device arranged to project a background image; and
means to minimize transparency of the virtual image relative to the background image;
wherein the transparency minimizing means comprise a light source arranged to project light onto the virtual three-dimensional image, the frequency of the projected light corresponding to the light frequency of the background image;
wherein the first projection device comprises a projector, a frame, and an at least partially transparent screen: the frame being arranged to retain the screen under tension, such that the screen is inclined at an angle with respect to a plane of emission of light from the projector; the screen having a front surface arranged such that light emitted from the projector is reflected therefrom; and the projector being arranged to project an image such that light forming the image impinges upon the screen such that a virtual image is created from light reflected from the screen, the virtual image appearing to be located behind the screen.

* * * * *